(12) United States Patent
Dorland et al.

(10) Patent No.: US 9,114,687 B2
(45) Date of Patent: Aug. 25, 2015

(54) AC DUAL JOINT-BLOCK DESIGN

(71) Applicant: DENSO International America, Inc., Southfield, MI (US)

(72) Inventors: Nathan Dorland, West Bloomfield, MI (US); James Link, West Bloomfield, MI (US); Douglas Forsyth, Waterford, MI (US)

(73) Assignee: DENSO International America, Inc., Southfield, MI (US)

( * ) Notice: Subject to any disclaimer, the term of this patent is extended or adjusted under 35 U.S.C. 154(b) by 42 days.

(21) Appl. No.: 13/838,206

(22) Filed: Mar. 15, 2013

(65) Prior Publication Data

US 2014/0265307 A1    Sep. 18, 2014

(51) Int. Cl.
| | |
|---|---|
| *F16L 39/00* | (2006.01) |
| *B60H 1/00* | (2006.01) |
| *F25B 41/06* | (2006.01) |
| *F16L 41/08* | (2006.01) |

(52) U.S. Cl.
CPC .......... *B60H 1/00571* (2013.01); *F25B 41/062* (2013.01); *F16L 41/086* (2013.01); *Y10T 29/49826* (2015.01)

(58) Field of Classification Search
USPC ........... 285/208, 207, 206, 205, 124.3, 124.4, 285/124.5
See application file for complete search history.

(56) References Cited

U.S. PATENT DOCUMENTS

| | | | | |
|---|---|---|---|---|
| 3,929,356 | A | * | 12/1975 | DeVincent et al. ........ 285/124.5 |
| 4,468,054 | A | * | 8/1984 | Orth ............................ 285/124.3 |
| 5,234,185 | A | * | 8/1993 | Hoffman et al. ................ 248/56 |
| 5,294,156 | A | * | 3/1994 | Kumazaki et al. .......... 285/124.2 |
| 5,387,014 | A | * | 2/1995 | Chevallier ..................... 285/206 |
| 5,467,611 | A | * | 11/1995 | Cummings et al. ............. 62/299 |
| 5,556,138 | A | * | 9/1996 | Nakajima et al. ........... 285/124.4 |
| 5,853,201 | A | * | 12/1998 | Izumi et al. .................... 285/208 |
| 5,860,681 | A | * | 1/1999 | Slais .......................... 285/124.3 |
| 6,070,659 | A | * | 6/2000 | Hosoya ......................... 285/206 |
| 6,682,100 | B2 | * | 1/2004 | Wood et al. ................. 285/124.3 |
| 6,866,300 | B2 | * | 3/2005 | Hayes et al. ................ 285/124.2 |
| 6,893,052 | B2 | * | 5/2005 | Wildermuth et al. ......... 285/205 |
| 7,464,966 | B2 | * | 12/2008 | Miyajima et al. ........... 285/124.3 |
| 7,469,934 | B2 | * | 12/2008 | Inaba et al. ................. 285/124.3 |
| 7,510,217 | B2 | * | 3/2009 | Burmeister et al. ........ 285/124.3 |
| 7,604,258 | B2 | * | 10/2009 | Getto et al. ................. 285/124.3 |
| 7,637,538 | B2 | * | 12/2009 | Tchang et al. .............. 285/124.4 |
| 7,971,910 | B2 | * | 7/2011 | Holt et al. ...................... 285/208 |
| 8,172,273 | B2 | * | 5/2012 | Wildermuth .................. 285/206 |
| 8,430,365 | B2 | * | 4/2013 | Benoit et al. ............... 285/124.3 |
| 8,468,849 | B2 | * | 6/2013 | Kesler et al. .................. 285/208 |
| 2002/0117850 | A1 | * | 8/2002 | Wood et al. ................ 285/124.1 |

* cited by examiner

*Primary Examiner* — David E Bochna
(74) *Attorney, Agent, or Firm* — Harness, Dickey & Pierce, P.L.C.

(57) ABSTRACT

A dual joint block for pressing a seal against an air conditioner thermal expansion valve housing. The dual joint block includes a body having an inner face and an outer face. The body defines a first aperture and a second aperture. The first aperture extends through the body between the inner face and the outer face. The first aperture is configured to completely surround a first conduit extending therethrough. The second aperture extends through the body between the inner face and the outer face, and is configured to completely surround a second conduit extending therethrough.

9 Claims, 3 Drawing Sheets

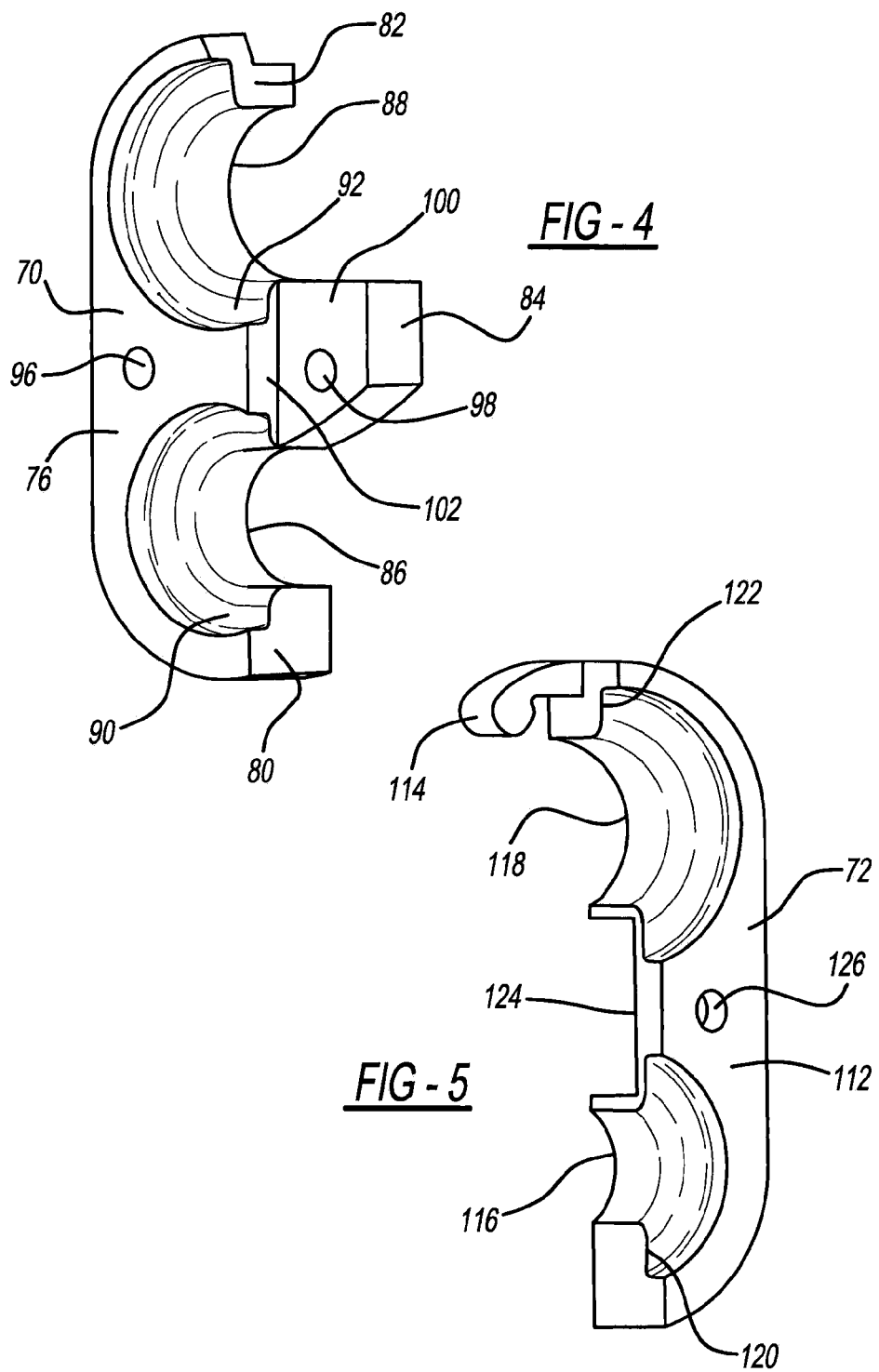

AC DUAL JOINT-BLOCK DESIGN

FIELD

The present disclosure relates to a connector block, such as for a thermal expansion valve of an air conditioning system.

BACKGROUND

This section provides background information related to the present disclosure which is not necessarily prior art.

Flow of refrigerant through an evaporator of an air conditioning system is often controlled by a thermal expansion valve (TXV) located within a TXV housing. The TXV meters flow of refrigerant to the evaporator based on temperature of the refrigerant that has passed through the evaporator, as sensed by a sensor bulb. On an evaporator side of the TXV housing, an evaporator "in" line and an evaporator "out" line extend from the TXV housing. O-rings are often used to seal the evaporator lines to the TXV housing. An E-shaped connector block is often secured to the evaporator side of the TXV housing to compress the o-rings against the TXV housing. Because o-rings seal radially on the inside surfaces of the TXV ports, an E-block is sufficient for sealing. "E" blocks are not ideal for other types of seals though, such as slimline seals. A connector block that completely surrounds the evaporator lines and provides uniform seal compression would be advantageous, particularly for applications using slimline joints, which require axial sealing.

SUMMARY

This section provides a general summary of the disclosure, and is not a comprehensive disclosure of its full scope or all of its features.

The present teachings provide for a dual joint block for pressing a seal against an air conditioner thermal expansion valve housing. The dual joint block includes a body having an inner face and an outer face. The body defines a first aperture and a second aperture. The first aperture extends through the body between the inner face and the outer face. The first aperture is configured to completely surround a first conduit extending therethrough. The second aperture extends through the body between the inner face and the outer face, and is configured to completely surround a second conduit extending therethrough.

The present teachings also provide for a dual joint block for pressing a seal against an air conditioner thermal expansion valve housing. The dual joint block includes a first block portion, a second block portion, a first aperture, and a second aperture. The second block portion is configured to be coupled to the first block portion. The first aperture is defined between the first block portion and the second block portion, the first aperture configured to entirely surround a first conduit line extending therethrough. The second aperture is defined between the first block portion and the second block portion, the second aperture configured to entirely surround a second conduit line extending therethrough.

The present teachings further provide for a method of pressing a seal against a thermal expansion valve housing to form a seal between air conditioner lines and the housing. The method includes arranging a first block portion of a dual joint block against a first conduit line and a second conduit line; coupling a second block portion of the dual joint block to the first block portion; arranging the second block portion against the first conduit line and the second conduit line such that the first conduit line is completely surrounded by a first aperture defined by both the first block portion and the second block portion, and such that the second conduit line is completely surrounded by a second aperture defined by both the first block portion and the second block portion; and fastening the first block portion and the second block portion to a thermal expansion valve housing to press a seal between the dual joint block and the thermal expansion housing Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a rear perspective view of a first block portion of the dual joint block; and FIG. 5 is a rear perspective view of a second block portion of the dual joint block.

Corresponding reference numerals indicate corresponding parts throughout the several views of the drawings.

DETAILED DESCRIPTION

Example embodiments will now be described more fully with reference to the accompanying drawings.

Figure 1:
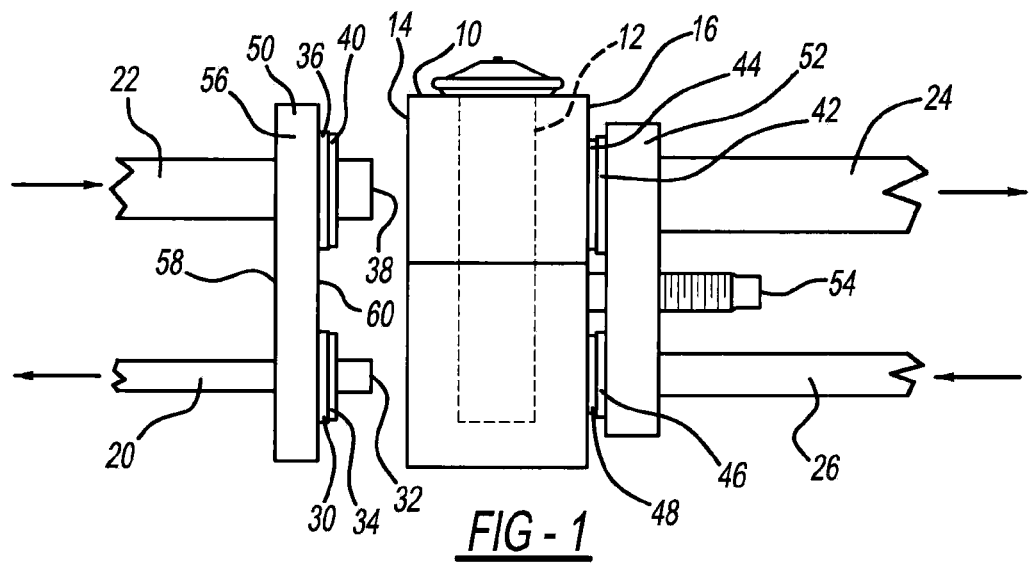
FIG. 1 is a side view of a thermal expansion valve (TXV) housing with conduits sealed thereto with a dual joint block according to the present teachings.

With initial reference to FIG. 1, a thermal expansion valve (TXV) housing 10 with a TXV 12 therein is illustrated. The TXV valve meters flow of refrigerant to an evaporator of a heating, ventilation, and air conditioning (HVAC) system, such as a motor vehicle HVAC system. The TXV housing 10 includes a first side or evaporator side 14 and a second side or compressor/condenser side 16. The first side 14 is opposite to the second side 16.

The TXV housing 10 is connected to the evaporator at the first side 14. Specifically, a first output line (or evaporator "in" line) 20 is coupled at the first side 14 to direct refrigerant away from the TXV housing 10 into the evaporator. A first input line (or evaporator "out" line) 22 directs refrigerant away from the evaporator and to the TXV housing 10, and is coupled to the TXV housing 10 at the first side 14.

At the second side 16 of the TXV housing 10, a second output line 24 is coupled to the TXV housing in order to direct refrigerant to a compressor of the HVAC system. A second input line 26 is also coupled to the second side 16. The second input line 26 directs refrigerant from a condenser to the TXV housing 10 and the TXV 12. The first output line 20, the first input line 22, the second output line 24, and the second input line 26 will now be described in additional detail.

The first output line 20 includes a first output line flange 30 proximate to a terminal end 32 of the first output line 20. A first seal 34 is seated on the first output line 20 between the first output line flange 30 and the terminal end 32. The first seal 34 is positioned to abut the first output line flange 30.

The first input line 22 includes a first input line flange 36 that is proximate to a terminal end 38 of the first input line 22. A second seal 40 is seated on the first input line 22 between the first input line flange 36 and the terminal end 38. The second seal 40 is positioned such that it abuts the first input line flange 36.

The second output line 24 includes a second output line flange 42. A third seal 44 is seated on the second output line 24 and abuts the second output line flange 42. The second input line 26 includes a second input line flange 46. A fourth seal 48 is seated on the second input line 26 and abuts the second input line flange 46.

The first seal 34, the second seal 40, the third seal 44, and the fourth seal 48 can each be any suitable seal for providing a fluid tight connection between the lines 20, 22, 24, and 26 and the TXV housing 10. For example, the seals 34, 40, 44, and 48 can be slim-line seals, such as the Stat-O-Seal® provided by Parker Hannifin Corporation.

The first output line 20 and the first input line 22 are coupled to the TXV housing 10 with a dual joint block 50. The second output line 24 and the second input line 26 are coupled to the TXV housing 10 with a block 52. As further described herein, the dual joint block 50 abuts a side of the first output line flange 30 opposite to the first seal 34, and abuts a side of the first input line flange 36 opposite to the second seal 40. Therefore, coupling the dual block 50 to the TXV housing 10 compresses and/or presses the first seal 34 and the second seal 40 against the TXV housing to seal the connection of the first output line 20 and the first input line 22 to the TXV housing 10. The block 52 seals the connection of the second input line 26 and the second output line 24 to the TXV housing 10 in a similar manner, such as by compressing and/or pressing the third seal 44 and the fourth seal 48 between the block 52 and the TXV housing 10. The block 52 is mounted to the TXV housing 10 with any suitable fastener, such as block fastener 54. The features of the dual block 50 described herein can also be applied to the block 52.

The dual block 50 includes a body 56, an outer face 58 and an inner face 60, which is opposite to the outer face 58. With additional reference to FIGS. 2-5, the dual block 50 generally includes a first block portion 70 and a second block portion 72. The first block portion 70 generally includes an outer surface 74 and a first inner surface 76 (FIG. 4). The first block portion 70 further includes a main body 78, a first flange 80 extending from the main body 78, and a second flange 82 extending from the main body 78. A third flange 84 also extends from the main body 78, and is between the first flange 80 and the second flange 82. The first flange 80 defines a first receptacle 86 between the first flange 80 and the main body 78, and the second flange 82 defines a second receptacle 88 between the second flange 82 and the main body 78 (FIGS. 3 and 4). Both the first receptacle 86 and the second receptacle 88 are generally U-shaped.

With reference to FIG. 4 for example, extending from the first receptacle 86 at the first inner surface 76 is a first recessed area 90. The first recessed area 90 is defined by the first inner surface 76. The first inner surface 76 further defines a second recessed area 92 extending from the second receptacle 88.

Figure 2:
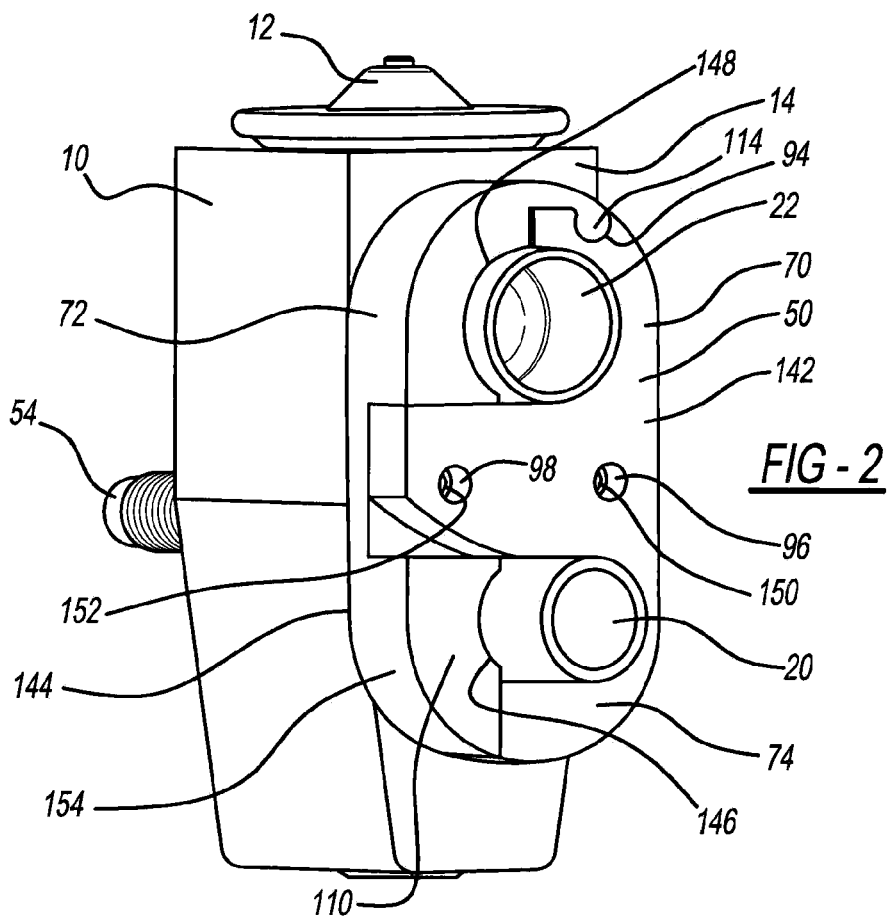
FIG. 2 is a perspective view of the dual joint block mounted to the TXV housing.
Figure 3:
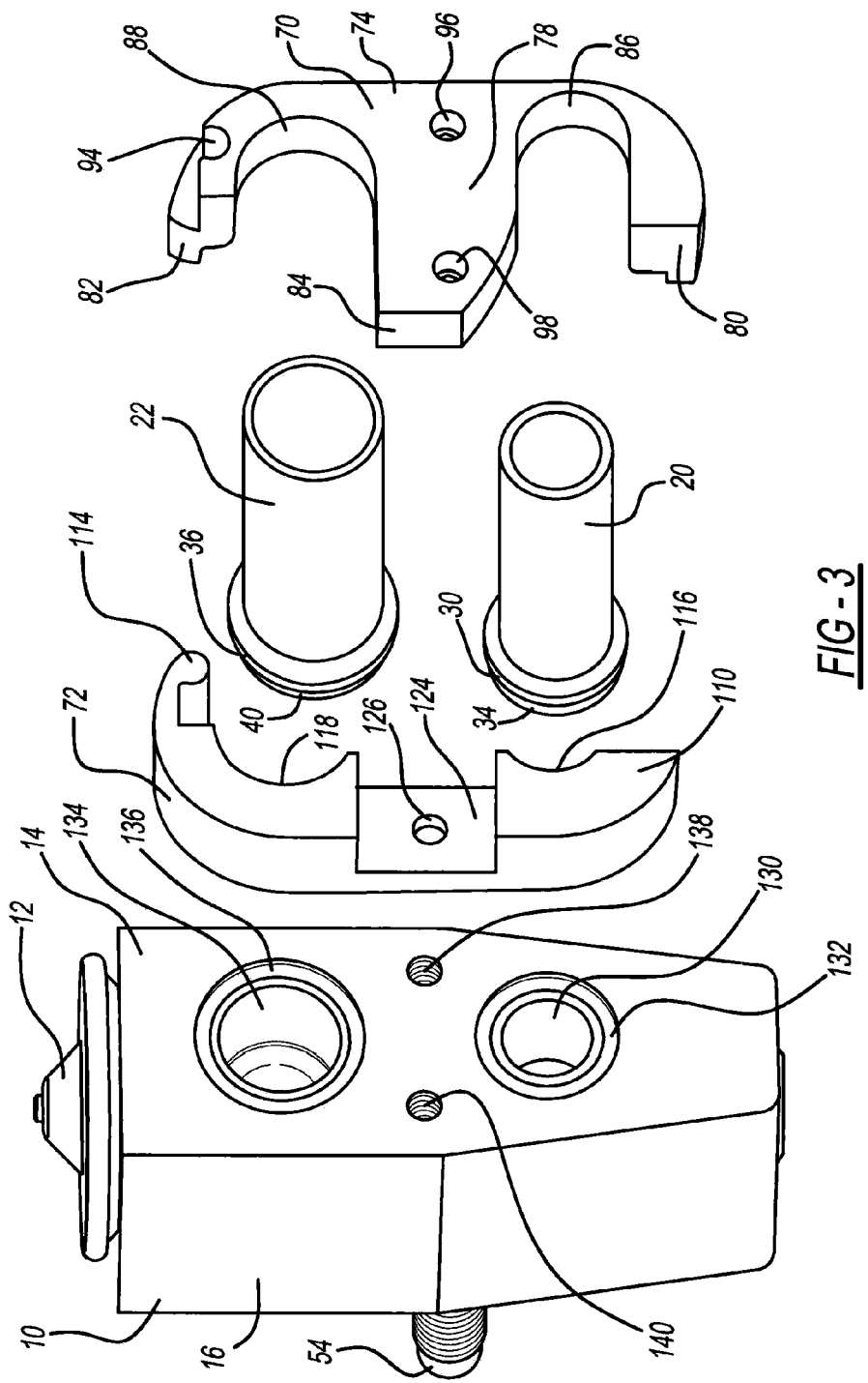
FIG. 3 is an exploded view of the dual joint block, the conduits, and seals for sealing the conduits to the TXV housing.

The second flange 82 defines an indentation 94, as illustrated in FIGS. 2 and 3 for example. The indentation 94 is configured to cooperate with a hinge 114 of the second block portion 72 as described herein, in order to couple the first block portion 70 and the second block portion 72 together.

The first block portion 70 defines a first fastener aperture 96, which extends through the main body 78 between the outer surface 74 and the first inner surface 76. The main body 78 also defines a second fastener aperture 98, which extends through the main body 78 between the outer surface 74 and an second inner surface 100, which is located at the third flange 84. The second inner surface 100 is recessed beneath the first inner surface 76, and thus a flange 102 is defined between the first inner surface 76 and the second inner surface 100.

The second block portion 72 includes an outer surface 110 (FIGS. 2 and 3 for example) and an inner surface 112 (FIG. 5 for example). The hinge 114 extends from an end of the second block portion 72. The hinge 114 includes a rounded flange configured for receipt within the indentation 94 of the first block portion 70, which provides a hinged connection between the first block portion 70 and the second block portion 72.

The second block portion 72 further includes a first concave surface 116 and a second concave surface 118. As illustrated in FIG. 5 for example, the inner surface 112 defines a first recessed area 120, which extends from the first concave surface 116. The inner surface 112 also defines a second recessed area 122 extending from the second concave surface 118. Between the first concave surface 116 and the second concave surface 118 is a mating surface 124, as illustrated in FIGS. 3 and 5 for example. The mating surface 124 is recessed beneath the outer surface 110, and thus provides a surface configured to receive the third flange 84 of the first block portion 70 thereon. The second block portion 72 defines a third fastener aperture 126 that extends through the second block portion 72 from the mating surface 124 to the inner surface 112.

As illustrated in FIG. 3, the TXV housing 10 defines a first bore 130 with a first counter bore 132 extending therefrom at the first side 14 of the TXV housing 10. The first bore 130 extends through the TXV housing 10 between the first side 14 and the second side 16. The TXV housing 10 defines a second bore 134 that extends through the TXV housing 10 from the first side 14 to the second side 16. The second bore 134 extends generally parallel to the first bore 130. Extending from the second bore 134 at the first side 14 of the TXV housing 10 is a second counter bore 136. The TXV housing 10 further defines a first fastener bore 138 and a second fastener bore 140 between the first and second bores 130 and 134. The first and second fastener bores 138 and 140 are configured to receive fasteners to secure the dual block 50 to the TXV housing 10, as further described herein.

As illustrated in FIG. 2, the first block portion 70 and the second block portion 72 couple together to define an outer face 142 and an inner face 144 of the dual block 50. The outer face 142 includes both the outer surface 74 of the first block portion 70 and the outer surface 110 of the second block portion 72. Similarly, the inner face 144 includes the first inner surface 76 of the first block portion 70 and the inner surface 112 of the second block portion 72. The inner face 144 is opposite to the outer face 142. The first receptacle 86 of the first block portion 70 and the first concave surface 116 of the second block portion 72 together define a first block aperture 146 of the dual block 50. The second receptacle 88 and the second concave surface 118 together define a second block aperture 148 of the dual block 50.

The first block portion 70 and the second block portion 72 are secured together and fastened to the TXV housing 10 with a first fastener 150 (FIG. 2) and a second fastener 152. The first fastener 150 extends through the first fastener aperture 96 and into the first fastener bore 138 of the TXV housing 10. The second fastener 152 extends through the second fastener aperture 98, through the third fastener aperture 126, and into the second fastener bore 140.

The first output line 20 is positioned within the first block aperture 146 such that the first output line flange 30 is seated in the first recessed area 90 of the first block portion 70, and seated in the first recessed area 120 of the second block portion 72. The first seal 34 is compressed and/or pressed by the dual block 50 between the first output line flange 30 and the first counter bore 132 as the dual block 50 is tightened against the TXV housing 10 to provide a fluid tight seal between the first output line 20 and the TXV housing 10. Because the dual block 50 completely surrounds the first output line 20, the first seal 34 is generally uniformly compressed and/or pressed about its diameter in order to enhance the sealing properties thereof.

Similarly, the first input line 22 is seated in the second block aperture 148 such that the second output line flange 36 is seated in the second recessed area 92 of the first block portion 70, and seated in the second recessed area 122 of the second block portion 72. The second seal 40 is arranged on the first input line 22 between the first input line flange 36 and the second counter bore 136. As the dual block 50 is tightened against the first side 14 of the TXV housing 10, the dual block 50 uniformly compresses and/or presses the second seal 40 about its diameter because the dual block 50 completely surrounds the first input line 22 at the second block aperture 148, thereby enhancing the seal between the first input line 22 and the TXV housing 10.

The dual block 50 need not be slid onto the lines 20 and 22, but can be rather clamped thereon by positioning the hinge 114 within the indentation 94, and then pivoting the first and second block portions 70 and 72 together and onto the first output line 20 and the first input line 22. Therefore, the dual block 50 can be coupled to the lines 20 and 22 and to the TXV housing 10 even after the lines 20 and 22 have been bent. This advantageously permits the lines 20 and 22 to be bent prior to coupling the dual block 50 to the TXV housing 10.

The dual block 50 provides a continuous outer or side surface 154, as illustrated in FIG. 2 for example. This continuous outer or side surface 154 provides an enhanced base for a suitable seal, such as foam, for sealing the dual block 50 to any suitable HVAC component, such as an HVAC case. The continuous outer or side surface 154 thus contributes to enhancing a seal between the dual block 50 and an HVAC case, or any other suitable HVAC component.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of pressing a seal against a thermal expansion valve housing to form a seal between air conditioner lines and the housing, the method comprising:
    arranging a first block portion of a dual joint block against a first conduit line and a second conduit line;
    coupling a second block portion of the dual joint block to the first block portion;
    arranging the second block portion against the first conduit line and the second conduit line such that the first conduit line is completely surrounded by a first aperture defined by both the first block portion and the second block portion, and such that the second conduit line is completely surrounded by a second aperture defined by both the first block portion and the second block portion;
    fastening the first block portion and the second block portion to a thermal expansion valve housing with a first fastener to press a seal between the dual joint block and the thermal expansion valve housing, the fist fastener inserted through a first bore of the first block portion, a second bore of the second block portion aligned with the first bore where the first and second block portions overlap, and inserted into the thermal expansion valve housing; and
    fastening the first block portion and the second block portion to the thermal expansion valve housing such that an inner surface of the first block portion and an inner surface of the second block portion both contact the thermal expansion valve housing.

2. The method of claim 1, further comprising coupling the second block portion to the first block portion with a hinge.

3. The method of claim 1, further comprising coupling the second block portion to the first block portion such that the first block portion overlaps the second block portion at a center portion of each of the first block portion and the second block portion.

4. The method of claim 1, further comprising fastening the first block portion and the second block portion to the thermal expansion valve housing with a second fastener inserted through a third bore of the first block portion and directly into the thermal expansion valve housing without passing through the second block portion.

5. A dual joint block for pressing a seal against an air conditioner thermal expansion valve housing, the dual joint block comprising:
    a first block portion;
    a second block portion configured to couple with the first block portion;
    a first aperture defined by both the first block portion and the second block portion, the first aperture configured to completely surround a first conduit extending therethrough;
    a second aperture defined by both the first block portion and the second block portion, the second aperture configured to completely surround a second conduit extending therethrough;
    an inner face of the dual joint block including an inner surface of the first block portion and an inner surface of the second block portion;
    an outer face of the dual joint block including an outer surface of the first block portion and an outer surface of the second block portion, the outer face is opposite to the inner face;
    a first bore defined by the first block portion;
    a second bore defined by the second block portion at an area of the second block portion that overlaps the first block portion when the first and the second block portions are coupled together such that the first and the second bores are aligned; wherein
    the dual joint block is configured to be secured to the air conditioner thermal expansion valve housing with a first fastener extending through the first and the second bores and into the air conditioner thermal expansion valve housing such that upon tightening the first fastener the seal is pressed against both the air conditioner thermal expansion valve housing and the dual joint block; and
    the first block portion defines a third bore at an area where the first and the second block portions do not overlap when the first and the second block portions are coupled together, the third bore configured to receive a second fastener therethrough and into the air conditioner thermal expansion valve housing.

6. The dual joint block of claim 5, wherein the first block portion defines an indentation configured to receive a hinge of the second block portion to couple the first block portion to the second block portion.

7. The dual joint block of claim 5, wherein the first aperture is defined by a first U-shaped receptacle of the first block portion and a first concave surface of the second block portion.

8. The dual joint block of claim 7, wherein the second aperture is defined by a second U-shaped receptacle of the first block portion and a second concave surface of the second block portion.

9. The dual joint block of claim 5, wherein the first bore, the second bore, and the third bore are each defined between the first and the second apertures when the first and the second block portions are coupled together.

* * * * *